«12» United States Patent
Haas et al.

«10» Patent No.: US 9,063,987 B2
«45» Date of Patent: *Jun. 23, 2015

«54» MANAGING UNCERTAIN DATA USING MONTE CARLO TECHNIQUES

«75» Inventors: Peter J Haas, San Jose, CA (US); Ravindranath Jampani, Gainesville, FL (US); Christopher M Jermaine, Ocala, FL (US); Luis L Perez, Gainsville, FL (US); Mingxi Wu, Belmont, CA (US); Fei Xu, Gainesville, FL (US)

«73» Assignee: International Business Machines Corporation, Armonk, NY (US)

«*» Notice: Subject to any disclaimer, the term of this patent is extended or adjusted under 35 U.S.C. 154(b) by 0 days.

This patent is subject to a terminal disclaimer.

«21» Appl. No.: 13/495,610

«22» Filed: Jun. 13, 2012

«65» Prior Publication Data

US 2012/0254238 A1   Oct. 4, 2012

Related U.S. Application Data

«63» Continuation of application No. 12/477,856, filed on Jun. 3, 2009, now Pat. No. 8,234,295.

«51» Int. Cl.
*G06F 17/30* (2006.01)
«52» U.S. Cl.
CPC .............................. *G06F 17/30536* (2013.01)
«58» Field of Classification Search
CPC .................................. G06F 17/30; G06F 17/00
See application file for complete search history.

«56» References Cited

U.S. PATENT DOCUMENTS

| | | |
|---|---|---|
| 4,994,736 A | 2/1991 | Davis et al. |
| 5,719,796 A | 2/1998 | Chen |
| 5,799,312 A | 8/1998 | Rigoutsos |
| 5,801,971 A | 9/1998 | Ohta |
| 5,802,525 A | 9/1998 | Rigoutsos |
| 5,828,752 A | 10/1998 | Iwamura et al. |
| 5,966,312 A | 10/1999 | Chen |
| 6,061,662 A | 5/2000 | Makivic |
| 6,378,088 B1 | 4/2002 | Mongan |
| 6,456,982 B1 | 9/2002 | Pilipovic |
| 6,684,193 B1 | 1/2004 | Chavez et al. |
| 7,236,171 B2 | 6/2007 | Keller |
| 7,328,228 B2 | 2/2008 | Klein et al. |

(Continued)

OTHER PUBLICATIONS

Jampani, Ravi, Xu, Fei, Wu, Mingxi, "MCDB: A Monte Carlo Approach to Managing Uncertain Data," Jun. 9-12, 2008, Vancouver, BC, ACM SIGMOD '08, pp. 687-700.*

(Continued)

*Primary Examiner* — Farhan Syed
«74» *Attorney, Agent, or Firm* — Jeffrey T. Holman

«57» ABSTRACT

According to one embodiment of the present invention, a method for managing uncertain data is provided. The method includes specifying data uncertainty using at least one variable generation (VG) function. The VG function generates pseudorandom samples of uncertain data values. A random database based on the VG function is specified and multiple Monte Carlo instantiations of the random database are generated. Using a Monte Carlo method, a query is repeatedly executed over the multiple Monte Carlo instantiations to output a Monte Carlo method result and associated query-results. The Monte Carlo method result may then be used to estimate statistical properties of a probability distribution of the query-result.

13 Claims, 6 Drawing Sheets

(56) References Cited

U.S. PATENT DOCUMENTS

| | | | |
|---|---|---|---|
| 7,363,299 B2 | 4/2008 | Dalvi et al. | |
| 7,383,262 B2 | 6/2008 | Das et al. | |
| 7,411,188 B2 | 8/2008 | deCecco et al. | |
| 7,430,501 B2 | 9/2008 | Feraille et al. | |
| 7,467,170 B1 | 12/2008 | Chen et al. | |
| 7,480,601 B2 | 1/2009 | Tryon, III | |
| 7,552,076 B1 | 6/2009 | Uenohara et al. | |
| 7,627,495 B2 | 12/2009 | Mathews et al. | |
| 7,635,602 B2 | 12/2009 | Suzuki | |
| 7,814,113 B2 | 10/2010 | Suciu et al. | |
| 7,831,456 B2 | 11/2010 | Demir et al. | |
| 7,835,893 B2 | 11/2010 | Cullick et al. | |
| 7,865,460 B2 * | 1/2011 | Hamilton et al. | 707/609 |
| 7,884,321 B2 | 2/2011 | deCecco et al. | |
| 7,886,243 B1 | 2/2011 | Gumaste et al. | |
| 8,209,202 B2 * | 6/2012 | Narayanan et al. | 705/7.11 |
| 2002/0026347 A1 | 2/2002 | Yanagino et al. | |
| 2003/0049687 A1 | 3/2003 | Skolnick | |
| 2004/0249696 A1 | 12/2004 | Mathews et al. | |
| 2005/0004833 A1 | 1/2005 | Mcrae et al. | |
| 2005/0021288 A1 | 1/2005 | Willink et al. | |
| 2005/0096893 A1 | 5/2005 | Feraille et al. | |
| 2005/0177485 A1 | 8/2005 | Peter | |
| 2006/0106637 A1 | 5/2006 | Johnson et al. | |
| 2006/0200333 A1 * | 9/2006 | Dalal et al. | 703/17 |
| 2006/0206295 A1 | 9/2006 | Tryon, III | |
| 2006/0247990 A1 * | 11/2006 | Narayanan et al. | 705/35 |
| 2007/0010973 A1 | 1/2007 | deCecco et al. | |
| 2008/0059395 A1 | 3/2008 | Flinn et al. | |
| 2008/0109428 A1 | 5/2008 | Suciu et al. | |
| 2008/0120148 A1 * | 5/2008 | Narayanan et al. | 705/7 |
| 2008/0166824 A1 | 7/2008 | Suzuki | |
| 2008/0208542 A1 | 8/2008 | Hamaguchi | |
| 2009/0132340 A1 | 5/2009 | Demir et al. | |
| 2009/0240643 A1 | 9/2009 | Bridgewater et al. | |
| 2009/0282090 A1 * | 11/2009 | Hamilton et al. | 707/204 |
| 2009/0324060 A1 | 12/2009 | Sato et al. | |
| 2010/0050182 A1 | 2/2010 | Mintz et al. | |
| 2010/0179792 A1 | 7/2010 | Kurusu et al. | |
| 2010/0235362 A1 | 9/2010 | Cormode et al. | |
| 2010/0243431 A1 | 9/2010 | Kuboi et al. | |
| 2010/0250187 A1 | 9/2010 | Zuber et al. | |
| 2010/0312775 A1 * | 12/2010 | Haas et al. | 707/759 |
| 2011/0090121 A1 | 4/2011 | Thomson et al. | |
| 2011/0320184 A1 * | 12/2011 | Beyer et al. | 703/22 |
| 2012/0323551 A1 * | 12/2012 | Beyer et al. | 703/22 |
| 2014/0278981 A1 * | 9/2014 | Mersov et al. | 705/14.53 |

OTHER PUBLICATIONS

Rauchaudhuri, Samik, "Introduction to Monte Carlo Simulation," Dec. 7-10, 2008, IEEE, Proceedings of the 2008 Winter Simulation Conference (WSC 2008), pp. 91-100 (10 total pages).*

Xu, Fei, Kevin Beyer, Vuk Ercegovac, Peter J. Haas, and Eugene J. Shekita. "E=MC 3: managing uncertain enterprise data in a clustercomputing environment." In Proceedings of the 2009 ACM SIGMOD International Conference on Management of data, pp. 441-454.*

Ökten, Giray, and Warren Eastman. "Randomized quasi-Monte Carlo methods in pricing securities." Journal of Economic Dynamics and Control 28, No. 12 (2004): 2399-2426.*

Jin, Junyi, and Wang, Xiaoqun, "New Brownian Bridge Construction in Quasi-Monte Carlo methods for computational finance," Journal of Complexity, ACM, vol. 24, Issue 2, Apr. 2008, pp. 109-133.*

Wang, Xiaoqun and Fang, Kai-Tai, "The effective dimension and quasi-Monte Carlo Integration," Journal of Complexity, Issue 19, 2003, pp. 101-124.*

Brodsky et al. "Decision-Guidance Management Systems (DGMS): Seamless Integration of Data Acquisition, Learning, Prediction, and Optimization" Proceedings of the 41st Hawaii Conference on System Sciences, (2008), 10 pages.

Sing et al. "Database Support for Probabilistic Attributes and Tuples" Proceedings of the 2008 IEEE 24th International Conference on Data Engineering, (2008), 9 pages.

Widom "Trio: A System for Data, Uncertainty, and Lineage" (2008), available at: http://ilpubs.stanford.edu:8090/843/1/2008-27.pdf, 34 pages, last accessed Jun. 11, 2012.

Garafalakis et al. "Probabilistic Data Management for Pervasive Computing: The Data Furnace Project" IEEE Data Eng. Bull, vol. 29, (2006), 7 pages.

Jamapani et al. "MCDB: A Monte Carlo Approach to Managing Uncertain Data" Proceedings of the 2008 ACM SIGMOD International Conference on Management of Data, (2008), 14 pages.

"TPC Benchmark H" Transaction Processing Performance Council, Standard Specification Rev. 2.8.0, (2008), 149 pages.

Dalvi et al. "Efficient Query Evaluation on Probabilistic Databases" The VLDB Journal (Jun. 2006), pp. 523-544.

Cheng et al. "Probabilistic Verifiers: Evaluating Contrained Nearest-Neighbor Queries over Uncertain Data" IEEE, ICDE 2008, pp. 973-982.

Kriegel et al. "Probabilistic Similarity Join on Uncertain Data" Spinger-Verlag, DASFAA 2006, pp. 295-309.

Tao et al. "Indexing Multi-Dimensional Uncertain Data with Arbritrary Probability Density Functions" Proceedings of the 31st VLDB Conference (2005), pp. 922-933.

Deshpande et al. "MauveDB: Supporting Model-Based User View in Database Systems" ACM SIGMOD '06, (Jun. 2006), pp. 73-84.

Huang et al. "MayBMS: A Probilistic Database Management System" ACM SIGMOD '09, (2009) pp. 1071-1073.

Koch "On Query Algebras for Probabilistic Databases" SIGMOD '08, vol. 37, No. 4, (Dec. 2008), pp. 78-85.

Re et al. "Efficient Top-k Query evaluation on Probabilistic Data" IEEE International Conference on Data Engineering, (Apr. 2007), pp. 886-895.

Zhang et al. "Effectively Indexing Uncertain Moving Objects for Predictive Queries" VLDB '09, (Aug. 2009), pp. 1198-1209.

* cited by examiner

```
1   If newRep
2      newRep = false
3      uniform = myRandGen()
4      probSum = i = 0
5      while (uniform >= probSum) :
6         i = i + 1
7         probSum = probSum + (L[i].wt/totWeight)
8      return L[i].str
9   Else:
10     newRep = true
11     return NULL
```

FIG. 1

```
1    VG.Initialize (t_i.seed)
2    For each tuple s in the group S_i:
3       VG.TakeParams(π_InAtts(s))
4    OutputTuples =
5    For j = 1 to N:
6       For k = 1 to ∞:
7          temp = VG.OutputVals()
8          If temp is NULL, then break
9          OutputTuples[j][k] = π_VGAtts(temp) • t_i.seed
10   VG.Finalize()
```

FIG. 3

MANAGING UNCERTAIN DATA USING MONTE CARLO TECHNIQUES

CROSS-REFERENCE TO RELATED APPLICATIONS

This application is a continuation of U.S. application Ser. No. 12/477,856, filed on Jun. 3, 2009, which is incorporated by reference herein in its entirety.

STATEMENT OF FEDERALLY SPONSORED RESEARCH

This invention was made with Government support under Grant Numbers 0612170 and 0347408 awarded by the National Science Foundation. The Government has certain rights in the invention.

BACKGROUND

The present invention relates to a database system, and more specifically, to managing uncertainty in database systems.

The level of uncertainty in data warehouses and other information repositories is increasing rapidly due to entity-resolution processes in data integration, automated information extraction from unstructured text, measurement errors in RFID and sensor systems, and anonymization of data for privacy protection. The operation of virtually any modern enterprise requires risk assessment and decision-making in the presence of such uncertain information. Ignoring uncertainty can put an enterprise at risk, for example, by leading to overly optimistic assessments of the value of a company's assets, or by leading to operating policies that result in violations of customer agreements or government regulations.

Consequently, there has been much research on how to represent and manage uncertain data. Much of this effort has focused on the problem of extending relational database systems to handle uncertainty, including work on data-intensive stochastic modeling to capture uncertainty caused by interpolated or predicted data values. In a common paradigm of uncertainty, the answer to a database query is not deterministic, as in classical query processing, but rather there is a probability distribution over possible query answers, and the problem of interest is to compute or estimate important features of this query-result distribution (such as its mean, variance, or quantiles). For example, an extended relational model (ERM) has been developed, in which the classical relational model is augmented with attribute-level or tuple-level probability values, which are loaded in to the database along with the data itself.

SUMMARY

Embodiments of a method are described. According to one embodiment, the method includes specifying data uncertainty using at least one variable generation (VG) function. The VG function generates pseudorandom samples of uncertain data values. The method also includes specifying a random database based on the VG function. The method also includes generating a number N Monte Carlo instantiations of the random database. N is a number greater than 1. The method also includes identifying a database tuple bundle t. The database tuple bundle t is a data structure representing N instantiations of a tuple in the N Monte Carlo instantiations. The method also includes executing a query Q over the N Monte Carlo instantiations. The executing includes executing a query plan for the query Q once over the set of all database tuple bundles. The executing also includes outputting zero or more numerical values. The zero or more numerical values are used to estimate statistical properties of the probability distribution of the result of the query Q.

Embodiments of another method described. In one embodiment, the method includes specifying data uncertainty using at least one variable generation (VG) function. The VG function generates pseudorandom samples of uncertain data values. The method also includes specifying a random database based on the VG function. The method also includes generating multiple Monte Carlo instantiations of the random database. The method also includes using a Monte Carlo method, repeatedly executing a query over the multiple Monte Carlo instantiations to output a Monte Carlo method result and associated query-results. The method also includes using the Monte Carlo method result, estimating statistical properties of a probability distribution of the query-result.

Embodiments of a system are described. The system includes a database containing uncertain data values and zero or more parameter tables. The system also includes a variable generation (VG) function component that receives the results of SQL queries over the parameter tables as input and that outputs pseudorandom samples of the uncertain data values. The system also includes a random database comprising the pseudorandom samples. The system also includes a processor generating multiple Monte Carlo instantiations of the random database. The system also includes a query execution component receiving a query and executing a query over the multiple Monte Carlo instantiations to output a Monte Carlo result and associated query-results. The system also includes a statistical property estimator receiving the Monte Carlo result and estimating statistical properties of a probability distribution of the query result.

Embodiments of a computer program product for managing uncertain data are described. The computer program product includes a non-transitory computer readable medium. The non-transitory computer readable medium embodies computer usable program code. The computer usable program code is configured to specify data uncertainty using at least one variable generation (VG) function. The VG function generates pseudorandom samples of uncertain data values. The computer usable program code is also configured to specify a random database based on the VG function. The computer usable program code is also configured to generate multiple Monte Carlo instantiations of the random database. The computer usable program code is also configured to, using a Monte Carlo method, repeatedly execute a query over the multiple Monte Carlo instantiations to output a Monte Carlo method result and associated query-results. The computer usable program code is also configured to, using the Monte Carlo method result, estimate statistical properties of a probability distribution of the query-result.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 1 shows a pseudocode listing of a OutputVals( )method used to generate the DiscreteChoice value generation (VG) function in accordance with an embodiment of the invention;

FIG. 3 shows a pseudocode listing of the variable generation (VG) function step in the Instantiate operation shown in FIG. 2 in accordance with an embodiment of the invention;

DETAILED DESCRIPTION

Figure 2:
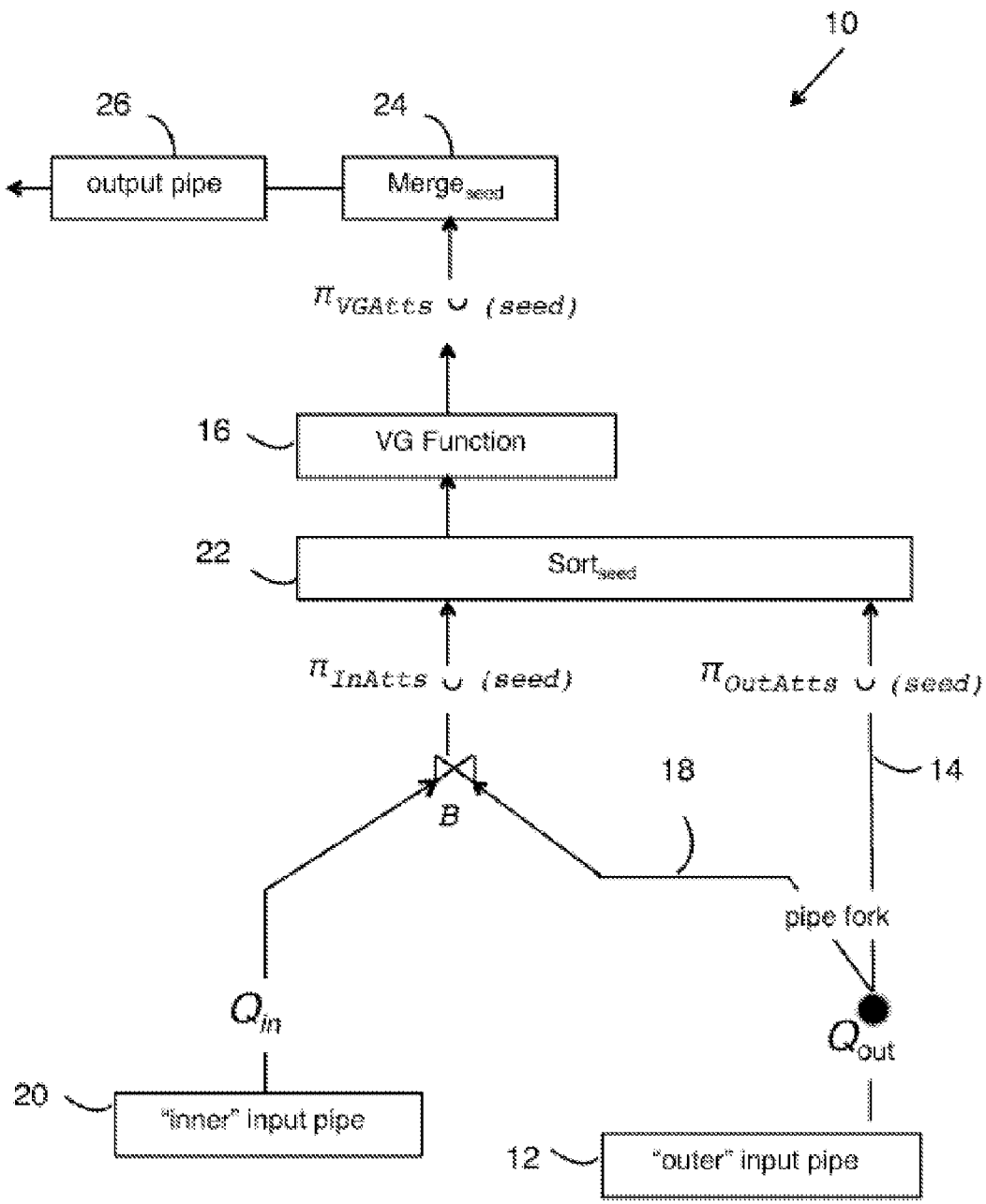
FIG. 2 shows a diagram of an Instantiate operation for a single inner input query in accordance with an embodiment of the invention.

Embodiments of the invention provide a Monte Carlo approach to managing uncertain data. These embodiments are an improvement over the above-discussed ERM approach, which can be quite inflexible. This inflexibility occurs for at least two key reasons. First, the representation of uncertainty is "hard wired" into the data model, and thus the types of uncertainty that can be processed are permanently limited by the specific model that has been chosen. If a new, unanticipated manifestation of uncertainty is later found to be important, but does not fit into the particular ERM being used, the only choice is to alter the data model itself. The user must then migrate the database to a new logical model, overhaul the database software, and likely change the physical database design.

Second, the uncertainty information, having been loaded in with the rest of the data, can be difficult to modify and limited in expressive power. Indeed, it rapidly becomes awkward to statically encode in an ERM anything more than the simplest types of uncertainty, such as (value, probability) pairs or standard distribution functions, e.g., in the form ("NormalDistn", meanVal, sigmaVal). If the probabilities associated with possible data values are derived from a complex statistical model, and the model or its parameters change, the probabilities typically need to be recomputed outside of the database and then loaded back in. It is therefore almost impossible to dynamically parameterize the uncertainty on the global state of the database or on results from arbitrary database queries.

As a result, there are many important types of uncertainty that seem difficult to handle in an ERM. An example is "extrapolation uncertainty," where the current state of the database is used to dynamically parameterize a statistical model that extrapolates the database into the past, the future, or into other possible worlds. Consider, for example, the TPC-H database schema["TPC Benchmark H (Decision Support) Standard Specification, Revision 2.8.0", Transaction Processing Performance Council (TPC), San Francisco, Calif., 2008.]. A corporation may wish to ask, "what would our profits have been during the last 12 months if we had raised all of our prices by 5%?" The problem is that we did not raise our prices by 5%, and so the relevant data are not present in the database. To handle this, we could use a Bayesian approach that combines a "prior" distribution model of customer demand (having parameters that are derived from the entire database) with a customer's observed order size to create a "posterior" distribution for each customer's demand under the hypothetical price increase. After computing the posterior demand for each customer, we could check the new profits that would be expected.

Implementing this kind of analysis in an ERM can be difficult. First, the statistical model is quite unique, so it is unlikely that it would be supported by any particular ERM. Moreover, the parameterization of the model depends upon the current database state in a complex way: in order to predict a customer's demand at a new price, it is necessary to consider the order sizes at the original price for all of the customers in the database and use this as input into a Bayesian statistical analysis. If the customer-demand analysis is to be performed on an ongoing basis, then it is necessary to parameterize the model on the fly. Finally, the posterior distribution function for a given customer's demand at the new price is quite complex; indeed, it cannot even be represented in closed form.

Embodiments of the invention use a new approach to handling enterprise-data uncertainty, embodied in a prototype system referred to herein as a Monte Carlo Database system, or MCDB. MCDB does not encode uncertainty within the data model itself—all query processing is over the classical relational data model. Instead, MCDB allows a user to define arbitrary variable generation (VG) functions that embody the database uncertainty. MCDB then uses these functions to pseudorandomly generate realized values for the uncertain attributes, and runs queries over the realized values. In the "what if" profit scenario outlined above, the user could specify a VG function that, for a given customer, performs a Bayesian inference step to determine the posterior demand distribution for the customer at the new, discounted price, and then pseudorandomly generates a specific order quantity according to this distribution. Importantly, VG functions can be parameterized on the results of SQL queries over "parameter tables" that are stored in the database. By storing parameters rather than probabilities, it is easy to change the exact form of the uncertainty dynamically, according to the global state of the database. Such dynamic parameterization is highly desirable both for representing complex stochastic models of uncertainty, as described above, and for exploring the effect on a query result of different assumptions about the underlying data uncertainty.

Since VG functions can be arbitrary, it is very difficult to analytically compute the effect on the query result of the uncertainty that they embody. MCDB avoids this problem by, in effect, using the VG functions to generate a large number of independent and identically distributed (i.i.d.) realizations of the random database—also called "possible worlds"—on the fly, and running the query of interest over each of them. Using these Monte Carlo replicates, MCDB summarizes the effect of the underlying uncertainty in the form of an empirical probability distribution over the possible query results. Since MCDB relies on computational brute force rather than complicated analytics, it gracefully avoids common deficiencies of the various ERM approaches, discussed below.

The embodiments of the invention use a "pure" Monte Carlo approach toward managing uncertain data. Although others have suggested the possibility of Monte Carlo techniques in probabilistic databases, to our knowledge, the present invention is the first system for which the Monte Carlo approach is fundamental to the entire system design.

The embodiments of the invention use a powerful and flexible representation of data uncertainty via schemas, VG functions and parameter tables. Also, a syntax for specifying random tables is provided that requires only a slight modification of SQL, and hence is easily understood by database programmers. The specification of VG functions is very similar to specification of user-defined functions (UDFs) in current database systems.

To ensure acceptable practical performance, embodiments of the invention provide new query processing algorithms that execute a query plan only once, processing "tuple bundles" rather than ordinary tuples. A tuple bundle encapsulates the instantiations of a tuple over a set of possible worlds. We exploit properties of pseudorandom number generators to maintain the tuple bundles in highly compressed form whenever possible.

It can be shown, by running a collection of interesting benchmark queries on our prototype system, that MCDB can provide unique functionality with acceptable performance overheads.

1. Monte Carlo Query Processing

VG functions provide a powerful and flexible framework for representing uncertainty by incorporating statistical methods directly into the database. One consequence of the extreme generality is that exact evaluation of query results—such as tuple appearance probabilities or the expected value of an aggregation query—is usually not feasible. From the point of view of MCDB, a VG function is a "black box" with an invisible internal mechanism, and thus indirect means must be used to quantify the relationship between a VG function and the query results that it engenders. Specifically, MCDB invokes the VG functions to provide pseudorandom values, and then uses those values to produce and evaluate many different database instances ("possible worlds") in Monte Carlo fashion.

The use of Monte Carlo techniques has some advantages. Monte Carlo has several important benefits compared to the exact-computation approach that underlies virtually all existing proposals. For example, unlike Monte Carlo, exact computation imposes strong restrictions both on the class of queries that can be handled and on the characteristics of the query answer that can be evaluated. Complex query constructs—e.g., EXISTS and NOT IN clauses, outer joins, or DISTINCT operators—cause significant difficulties for current exact approaches. Even relatively simple queries can result in #P complexity for query evaluation, and aggregation queries such as SUM and AVG, which are fundamental to OLAP and BI processing, can pose significant challenges. Moreover, it is often unclear how to compute important characteristics of the query output such as quantiles, which are essential for risk evaluation and decision-making. Of course, it is possible to extend the exact approach to handle broader classes of queries and inference problems, and work in this direction has been abundant. But adding more and more patches to the exact computation approach is not a satisfactory solution: almost every significant extension to the approach requires new algorithms and new theory, making system implementation and maintenance difficult at best.

Another benefit of the Monte Carlo approach is that the same general-purpose methods apply to any correlated or uncorrelated uncertainty model. In contrast, general models for statistical correlation can be quite difficult to handle (and model) using exact computation. This is evidenced by the sheer number of approaches tried. Proposals have included: storing joint probabilities in an ERM, e.g., (A1.value, A2.value, probability) triplets to specify correlations between attributes, storing joint probabilities over small subsets of attributes, and enhancing the stored probabilities with additional "lineage" information. Each of these models has its own sophisticated computational methods to measure the effect of the correlation—and yet none of them attempts to handle standard statistical dependencies such as those produced via a random walk (see Section 10, query Q3), much less dependencies described by complex models such as VARTA processes or copulas. Of course, one can always attempt to develop specialized algorithms to handle new types of correlation as they arise—but again, this is not a practical solution. At an abstract level, the task of computing probabilities based on many correlated input random variables can be viewed as equivalent to computing the value of an integral of a high-dimensional function. Such an integration task is extremely hard or impossible in the absence of very special structure; even the application of approximation methods, such as the central limit theorem, is decidedly non-trivial, since the pertinent random variables are, in general, non-identically distributed and dependent. Monte Carlo methods are well-known to be an effective tool for attacking this kind of problem.

Finally, Monte Carlo methods can easily deal with arbitrary, continuous distributions. It is possible to handle continuous distributions using the exact method, and relevant proposals exist. However, exact computation becomes difficult or impossible when continuous distributions do not have a closed-form representation; for example, evaluation of a "greater than" predicate requires expensive numerical integration. Such analytically intractable distributions arise often in practice, e.g., as posterior distributions in Bayesian analysis or as distributions that are built up from a set of base distributions by convolution and other operations.

Of course, the flexibility of the Monte Carlo approach is not without cost, and there are two natural concerns. First is the issue of performance. This is significant; implementation and performance are considered in detail in Sections 5 through 8 below, where we develop our "tuple bundle" approach to query processing.

Second, MCDB merely estimates its output results. However, we this concern may be easily overstated. Widely accepted statistical methods can be used to easily determine the accuracy of inferences made using Monte Carlo methods; see Section 4. Perhaps more importantly, the probabilities that are stored in a probabilistic database are often very rough estimates, and it is unclear whether exact computation over rough estimates makes sense. Indeed, the "uncertainty" will often be expressed simply as a set of constraints on possible data values, with no accompanying probability values for the various possibilities. For example, the age of a customer might be known to lie in the set $\{35, 36, \ldots, 45\}$, but a precise probability distribution on the ages might be unavailable. In such cases, the user must make an educated guess about this probability distribution, e.g., the user might simply assume that each age is equally likely, or might propose a tentative probability distribution based on pertinent demographic data. As another example, probabilities for extraction of structured data from text are often based on approximate generative models, such as conditional random fields, whose parameters are learned from training data; even these already approximate probabilities are sometimes further approximated to facilitate storage in an ERM. MCDB avoids allocating system resources to the somewhat dubious task of computing exact answers based on imprecise inputs, so that these resources can instead be used, more fruitfully, for sensitivity and what-if analyses.

2. Schema Specification

As mentioned above, MCDB is based on possible-worlds semantics. A relation is deterministic if its realization is the same in all possible worlds, otherwise it is random. Each random relation is specified by a schema, along with a set of VG functions for generating relation instances. The output of a query over a random relation is no longer a single answer, but rather a probability distribution over possible answers.

Random relations are specified using an extended version of the SQL CREATE TABLE syntax that identifies the VG functions used to generate relation instances, along with the parameters of these functions. We assume that each random relation R can be viewed as a union of blocks of correlated tuples, where tuples in different blocks are independent. This assumption entails no loss of generality since, as an extreme case, all tuples in the table can belong to the same block. At the other extreme, a random relation made up of mutually independent tuples corresponds to the case in which each block contains at most one tuple.

First consider a very simple setting, in which we wish to specify a table that describes patient systolic blood pressure data, relative to a default of 100 (in units of mm Hg). Suppose that, for privacy reasons, exact values are unavailable, but we know that the average shifted blood pressure for the patients is 10 and that the shifted blood pressure values are normally distributed around this mean, with a standard deviation of 5. Blood pressure values for different patients are assumed independent. Suppose that the above mean and standard deviation parameters for shifted blood pressure are stored in a single-row table SPB_PARAM (MEAN, STD) and that patient data are stored in a deterministic table PATIENTS (PID, GENDER). Then, the random table SBP_DATA can be specified as:

```
CREATE TABLE SBP_DATA(PID, GENDER, SBP) AS
    FOR EACH p in PATIENTS
        WITH SBP AS Normal (
            (SELECT s.MEAN, s.STD
             FROM SPB PARAM s))
        SELECT p.PID, p.GENDER, b.VALUE
        FROM SBP b
```

A realization of SBP_DATA is generated by looping over the set of patients and using the Normal VG function to generate a row for each patient. These rows are effectively UNIONed to create the realization of SBP_DATA. The FOR EACH clause specifies this outer loop. In general, every random CREATE TABLE specification has a FOR EACH clause, with each looping iteration resulting in the generation of a block of correlated tuples. The looping variable is tuple-valued, and iterates through the result tuples of a relation or SQL expression (the relation PATIENTS in our example).

The standard library VG function Normal pseudorandomly generates independent and identically distributed (i.i.d.) samples from a normal distribution, which serve as the uncertain blood pressure values. The mean and variance of this normal distribution is specified in a single-row table that is input as an argument to the Normal function. This single-row table is specified, in turn, as the result of an SQL query—a rather trivial one in this example—over the parameter table SPB_PARAM. The Normal function, like all VG functions, produces a relation as output—in this case, a single-row table having a single attribute, namely, VALUE.

The final SELECT clause assembles the finished row in the realized SBP_DATA table by (trivially) selecting the generated blood pressure from the single-row table created by Normal and appending the appropriate PID and GENDER values. In general, the SELECT clause "glues together" the various attribute values that are generated by one or more VG functions or are retrieved from the outer FOR EACH query and/or from another table. To this end, the SELECT clause may reference the current attribute values of the looping variable, e.g., p.PID and p.GENDER.

As a more complicated example, suppose that we wish to create a table of customer data, including the uncertain attributes MONEY, which specifies the annual disposable income of a customer, and LIVES_IN, which specifies the customer's city of residence. Suppose that the deterministic attributes of the customers are stored in a table CUST_ATTRS (CID, GENDER, REGION). That is, we know the region in which a customer lives but not the precise city. Suppose that, for each region, we associate with each city a probability that a customer lives in that city—thus, the sum of the city probabilities over a region equals 1. These probabilities are contained in a parameter table CITIES (NAME, REGION, PROB). The distribution of the continuous MONEY attribute follows a gamma distribution, which has three parameters: shift, shape and scale. All customers share the same shift parameter, which is stored in a single-row table MONEY_SHIFT (SHIFT). The scale parameter is the same for all customers in a given region, and these regional scale values are stored in a table MONEY_SCALE (REGION, SCALE). The shape-parameter values vary from customer to customer, and are stored in a table MONEY_SHAPE (CID, SHAPE). The (MONEY, LIVES_IN) value pairs for the different customers are conditionally mutually independent, given the REGION and SHAPE values for the customers. Similarly, given the REGION value for a customer, the MONEY and LIVES_IN values for that customer are conditionally independent. A specification for the CUST table is then:

```
CREATE TABLE CUST(CID, GENDER, MONEY, LIVES_IN) AS
    FOR EACH d in CUST_ATTRS
        WITH MONEY AS Gamma(
            (SELECT n.SHAPE
             FROM MONEY_SHAPE n
             WHERE n.CID = d.CID),
            (SELECT sc.SCALE
             FROM MONEY SCALE sc
             WHERE sc.REGION = d.REGION),
            (SELECT SHIFT
             FROM MONEY_SHIFT))
        WITH LIVES_IN AS DiscreteChoice (
            (SELECT c.NAME, c.PROB
             FROM CITIES c
             WHERE c.REGION = d.REGION))
        SELECT d.CID, d.GENDER, m.VALUE, l.VALUE
        FROM MONEY m, LIVES_IN l
```

We use the Gamma library function to generate gamma variates; we have specified three single-row, single-attribute tables as input. The DiscreteChoice VG function is a standard library function that takes as input a table of discrete values and selects exactly one value according to the specified probability distribution.

Note that by modifying MONEY_SHAPE, MONEY_SCALE, and MONEY_SHIFT, we automatically alter the definition of CUST, allowing what-if analyses to investigate the sensitivity of query results to probabilistic assumptions and the impact of different scenarios (e.g., an income-tax change may affect disposable income). Another type of what-if analysis that we can easily perform is to simply replace the Gamma or DiscreteChoice functions in the definition of CUST with alternative VG functions. Finally, note that the parameters for the uncertainty model are stored in a space-efficient denormalized form; we emphasize that parameter tables are standard relational tables that can be indexed to boost processing efficiency.

As a variant of the above example, suppose that associated with each customer is a set of possible cities of residence, along with a probability for each city. Assuming that this information is stored in a table CITIES (CID, NAME, PROB), we change the definition of LIVES_IN to:

```
WITH LIVES_IN AS DiscreteChoice (
    (SELECT c.NAME, c.PROB
    FROM CITIES c
    WHERE c.CID = d.CID))
```

Thus, MCDB can capture attribute-value uncertainty.

Tuple-inclusion uncertainty can also be represented within MCDB. Consider a variant of the above example in which the CUST_ATTRS table has an additional attribute INCL_PROB which indicates the probability that the customer truly belongs in the CUST table. To represent inclusion uncertainty, we use the library VG function Bernoulli, which takes as input a single row table with a single attribute PROB and generates a single-row, single-attribute output table, where the attribute VALUE equals true with probability p specified by PROB and equals false with probability 1−p. Augment the original query with the clause:
    WITH IN_TABLE AS Bernoulli (VALUES (d.INCL PROB)) where, as in standard SQL, the VALUES function produces a single row table whose entries correspond to the input arguments. Also modify the select clause as follows:

```
SELECT d.CID, d.GENDER, m.VALUE, l.VALUE
FROM MONEY m, LIVES_IN l, IN_TABLE i
WHERE i.VALUE = true
```

"Structural" uncertainty, i.e., fuzzy queries, can also be captured within the MCDB framework. For example, suppose that a table LOCATION (LID, NAME, CITY) describes customer locations, and another table SALES (SID, NAME, AMOUNT) contains transaction records for these customers. We would like to compute sales by city, and so need to join the tables LOCATION and SALES. We need to use a fuzzy similarity join because a name in LOCATION and name in SALES that refer to the same entity may not be identical, because of spelling errors, different abbreviations, and so forth. Suppose that we have a similarity function Sim that takes two strings as input, and returns a number between 0 and 1 that can be interpreted as the probability that the two input strings refer to the same entity. Then we define the following random table:

```
CREATE TABLE LS JOIN (LID, SID) AS
    FOR EACH t IN (
        SELECT l.LID, l.NAME AS NAME1,
            s.SID, s.NAME AS NAME2
        FROM LOCATIONS l, SALES s)
    WITH JOINS AS Bernoulli (
        VALUES(Sim(t.NAME1, t.NAME2)))
    SELECT t.LID, t.SID
    FROM JOINS j
    WHERE j.VALUE = true
```

Here Bernoulli is defined as before. The desired overall result is now given by the query:

```
SELECT l.CITY, SUM(s.AMOUNT)
FROM LOCATION l, SALES s, LS JOIN j
WHERE l.TID = j.LID AND s.SID = j.SID
GROUP BY l.CITY
```

Unlike the traditional approach, in which all tuples that are "sufficiently" similar are joined, repeated Monte Carlo execution of this query in MCDB yields information not only about the "most likely" answer to the query, but about the entire distribution of sales amounts for each city. We can then assess risk, such as the probability that sales for a given city lie below some critical threshold.

Correlated attributes are easily handled by using VG functions whose output table has multiple columns. Consider the case where a customer's income and city of residence are correlated:

```
CREATE TABLE CUST(CID, GENDER, MONEY, LIVES_IN) AS
    FOR EACH d in CUST ATTRS
        WITH MLI AS MyJointDistribution (...)
        SELECT d.CID, d.GENDER, MLI.VALUE1, MLI.VALUE2
        FROM MLI
```

The user-defined VG function MyJointDistribution outputs a single-row table with two attributes VALUE1 and VALUE2 corresponding to the generated values of MONEY and LIVES_IN.

MCDB can Also Handle Correlations Between Tuples.

Suppose, for example, that we have readings from a collection of temperature sensors. Because of uncertainty in the sensor measurements, we view each reading as the mean of a normal probability distribution. We assume that the sensors are divided into groups, where sensors in the same group are located close together, so that their readings are correlated, and thus the group forms a multivariate normal distribution. The table S_PARAMS (ID, LAT, LONG, GID) contains the sensor ID (a primary key), the latitude and longitude of the sensor, and the group ID. The means corresponding to the given "readings" are stored in a parameter table MEANS (ID, MEAN), and the correlation structure is specified by a covariance matrix whose entries are stored in a parameter table COVARS (ID1, ID2, COVAR). The desired random table SENSORS is then specified as follows:

```
CREATE TABLE SENSORS(ID, LAT, LONG, TEMP) AS
    FOR EACH g IN (SELECT DISTINCT GID FROM
S_PARAMS)
        WITH TEMP AS MDNormal(
            (SELECT m.ID, m.MEAN
            FROM MEANS m, SENSOR PARAMS ss
            WHERE m.ID = ss.ID AND ss.GID = g.GID),
            (SELECT c.ID1, c.ID2, c.COVAR
            FROM COVARS c, SENSOR PARAMS ss
            WHERE c.ID1 = ss.ID AND ss.GID = g.GID))
        SELECT s.ID, s.LAT, s.LONG, t.VALUE
        FROM SENSOR PARAMS s, TEMP t
        WHERE s.ID = t.ID
```

The subquery in the FOR EACH clause creates a single-attribute relation containing the unique group IDs, so that the looping variable g iterates over the sensor groups. The MDNormal function is invoked once per group, i.e., once per distinct value of g. For each group, the function returns a multi-row table having one row per group member. This table has two attributes: ID, which specifies the identifier for each sensor in the group, and VALUE, which specifies the corresponding generated temperature. The join that is specified in the final SELECT clause serves to append the appropriate latitude and longitude to each tuple produced by MDNormal, thereby creating a set of completed rows—corresponding to group g—in the generated table SENSORS.

3. Specifying VG Functions

A user of MCDB can take advantage of a standard library of VG functions, such as Normal ( ) or Poisson ( ), or can implement VG functions that are linked to MCDB at query-processing time. The latter class of customized VG functions is specified in a manner similar to the specification of UDFs in ordinary database systems. This process is described below.

In one embodiment, a VG function is implemented as a C++ class with four public methods: Initialize ( ), TakeParams ( ), OutputVals ( ), and Finalize ( ). For each VG function referenced in a CREATE TABLE statement, the following sequence of events is initiated for each tuple in the FOR EACH clause.

First, MCDB calls the Initialize ( ) method with the seed that the VG function will use for pseudorandom number generation. This invocation instructs the VG function to set up any data structures that will be required for random value generation.

Next, MCDB executes the queries that specify the input parameter tables to the VG function. The result of the query execution is made available to the VG function in the form of a sequence of arrays called parameter vectors. The parameter vectors are fed into the VG function via a sequence of calls to TakeParams ( ), with one parameter vector at each call.

After parameterizing the VG function, MCDB then executes the first Monte Carlo iteration by repeatedly calling OutputVals ( ) to produce the rows of the VG function's output table, with one row returned per call. MCDB knows that the last output row has been generated when OutputVals ( ) returns a NULL result. Such a sequence of calls to OutputVals ( ) can then be repeated to generate the second Monte Carlo replicate, and so forth.

When all of the required Monte Carlo replicates have been generated, MCDB invokes the VG function's Finalize ( ) method, which deletes any internal VG-function data structures.

The above discussion can be illustrated using a naive implementation of a very simple VG function, DiscreteChoice for strings. This VG function is slightly more general than the VG function defined above, in that the function accepts a set of character strings $x_1, x_2, \ldots, x_n$ and associated nonnegative "weights" $w_1, w_2, \ldots w_n$, then normalizes the weights into a vector of probabilities $\mathcal{P} = (p_1, p_2, \ldots, p_n)$ with $p_i = w_i / \Sigma_j w_j$, and finally returns a random string X distributed according to $\mathcal{P}$, i.e., $P\{X=x_i\}=p_i$ for $1 \le i \le n$. The function uses a standard "inversion" method to generate the random string, which is based on the following fact. Let U be a random number uniformly distributed on [0; 1]. Set $X=x_I$, where I is a random variable defined by $I = \min\{1 \le i \le n : U < \Sigma^i_{j=1} p_j\}$. Then:

$$P\{I = i\} = P\left\{\sum_{j=1}^{i=1} p_j \le U \le \sum_{j=1}^{i} p_j\right\} = pi$$

for $1 \le i \le n$. That is, X is distributed according to $\mathcal{P}$.

This DiscreteChoice function has a single input table with two columns that contain the strings and the weights, respectively, so that each input parameter vector v to this function is of length 2; we denote these two entries as v.str and v.wt. The output table has a single row and column, which contains the selected string.

One embodiment of the invention is implemented as follows. The Initialize ( ) method executes a statement of the form myRandGen=new RandGen (seed) to create and initialize a uniform pseudorandom-number generator myRandGen using the seed value that MCDB has passed to the method; a call to myRandGen returns a uniform pseudorandom number and, as a side effect, updates the value of seed. The method also allocates storage for a list L of parameter vectors; we can view L as an array indexed from 1. Next, the method initializes a class variable totweight to 0; this variable will store the sum of the input weights. Finally, the method also sets a class variable newRep to true, indicating that we are starting a new Monte Carlo repetition (namely, the first such repetition). The Finalize ( ) method de-allocates the storage for L and destroys myRandGen. The TakeParams ( ) function simply adds the incoming parameter vector v to the list L and also increments totweight by v.wt.

One of the more interesting of the methods is Output Vals ( ), whose pseudocode is given in FIG. 1. When OutputVals ( ) is called with newRep=true (line 1), so that we are starting a new Monte Carlo repetition, the algorithm uses inversion (lines 3-8) to randomly select a string from the list L, and sets newRep to false, indicating that the Monte Carlo repetition is underway. When OutputVals ( ) is called with newRep=false (line 9), a Monte Carlo repetition has just finished. The method returns NULL and sets newRep to true, so that the method will correctly return a non-NULL value when it is next called.

4. Inference and Accuracy

Using the Inference operator described in Section 7 below, MCDB returns its query results as a set of $(t_i, f_i)$ pairs, where $t_1, t_2, \ldots$ are the distinct tuples produced in the course of N Monte Carlo iterations and $f_i$ is the fraction of the N possible worlds in which tuple $t_i$ appears. Such results can be used to explore the underlying distribution of query answers in many different ways.

For example, in the presence of uncertain data, the answer X to an aggregation query Q such as SELECT SUM (sales) FROM T—where T is a random table—is no longer a fixed number, but a random variable, having a probability distribution that is unknown to the user. MCDB will, in effect, execute Q on N i.i.d. realizations of T, thereby generating N i.i.d. realizations of X. We can now plot the results in a histogram to get a feel for the shape of the distribution of X.

We can, however, go far beyond graphical displays: the power of MCDB lies in the fact that we can leverage over 50 years of Monte Carlo technology to make statistical inferences about the distribution of X, about interesting features of this distribution such as means and quantiles, and about the accuracy of the inferences themselves. For example, if we are interested in the expected value of the answer to Q, we can estimate $E[X]$ by $\bar{x}_N = N^{-1} \Sigma_{i=1}^d y_i n_i$, where $y_1, y_2, \ldots y_d$ are the distinct values of X produced in the course of the N Monte Carlo iterations, and $n_i$ is the number of possible worlds in which $X=y_i$ so that $\Sigma^d_{i=1} n_i = N$. (In this example, the SUM query result is a single-row, single-attribute table, so that $y_i = t_i$ and $n_i = f_i N$.) We can also assess the accuracy of $\bar{x}_N$ as an estimator of $E[X]$: assuming N is large, the central limit theorem implies that, with probability approximately 95%, the quantity $\bar{x}_N$ estimates $E[X]$ to within $\pm 1.96 \hat{\sigma}_N / \sqrt{N}$, where $\hat{\sigma}_N^2 = (N-1)^{-1} \Sigma_{i=1}^d (y_i - \bar{x}_N)^2 n_i$. If we obtain preliminary values of $\bar{x}$ and $\hat{\sigma}_N$, say, from a small pilot execution, then we can turn the above formula around and estimate the number of Monte Carlo replications needed to estimate $E[X]$ to within a desired precision.

Analogous results apply to estimation of quantiles and other statistics of interest. Indeed, we can use Kolmogorov's theorem to approximate the entire cumulative distribution function of X. For example, denoting this function by F and the empirical distribution function by $F_N$, Kolmogorov's theorem implies that with probability approximately 95%, the absolute difference $|F(x) - F_N(x)|$ is bounded above by $1:36/\sqrt{N}$ for all x. If the distribution of X is known to have a probability density function, then this function can be estimated using a variety of known techniques; note that a histogram can be viewed as one type of density estimator. Besides estimation, we can perform statistical tests of hypotheses such as "the expected value of the result of $Q_1$ is greater than the expected value of the result of $Q_2$." If $Q_1$ and $Q_2$ correspond to two different business policies, then we are essentially selecting the best policy, taking into account the uncertainty in the data; more sophisticated "ranking and selection" procedures may also be used with MCDB.

More generally, the answer X to a query can be an entire (random) table. In this case, we can, for example, use the results from MCDB to estimate the true probability that a given tuple $t_i$ appears in the query answer; this estimate is simply $f_i$. We can also compute error estimates on $f_i$, perform hypothesis tests on appearance probabilities, and so forth. The idea is to consider a transformation $\phi_i(X)$ of the random, table-valued query result X, where $\phi_i(X)=1$ if $t_i$ appears in X, and $\phi_i(X)=0$ otherwise. Then, on each possible world, the result of our transformed query is simply a number (0 or 1), and the previous discussion applies in full generality, with $f_i = \bar{x}_N$.

In one embodiment of the invention, the $(t_i, f_i)$ pairs are returned in the form of a relational table, so that many of the statistical analyses described above can be implemented as SQL queries. In other embodiments, the pairs are written to a file or streamed into a statistical analysis package, or are used to directly compute statistics of interest in a running manner.

Alternative embodiments of the invention may store more detailed information than that produced by the inference operator, for example, a bit vector may be produced for each distinct tuple that specifies the precise set of Monte Carlo repetitions in which the tuple has appeared at least once. This additional information permits estimation of even more statistical properties of the query distribution, such as the joint-appearance probabilities of a specified set of tuples.

In summary, MCDB permits the use of powerful inference tools that can be used to study results of queries on uncertain data. Many other estimation methods, stochastic optimization techniques, hypothesis tests, and efficiency-improvement techniques may also be applicable within MCDB.

5. Query Processing in MCDB

The basic query-processing ideas underlying one embodiment of the invention will now be presented. Logically, the MCDB query processing engine evaluates a query Q over many different database instances, and then uses the various result sets to estimate the appearance probability for each result tuple. One simple method for implementing this process is the following. Given a query Q over a set of deterministic and random relations, the following three steps may be repeated N times, where N is the number of Monte Carlo iterations specified:

1. Generate an instance of each random relation as specified by the various CREATE TABLE statements.
2. Once an entire instance of the database has been materialized, compile, optimize, and execute Q in the classical manner.
3. Append every tuple in Q's answer set with a number identifying the current Monte Carlo iteration.

Once N different answer sets have been generated, all of the output tuples are then merged into a single file, sorted, and scanned to determine the number of iterations in which each tuple appears.

Unfortunately, although this basic scheme is quite simple, it may have satisfactory performance in practice. The problem is that each individual database instance may be very large—perhaps terabytes in size—and N is likely to be somewhere from 10 to 1000. Thus, this relatively naive implementation may be impractical, and so embodiments of MCDB uses a different strategy.

Embodiments of MCDB query processing use the following concepts:

MCDB Runs Each Query One Time, Regardless of N.

In MCDB, Q is evaluated only once, whatever value of N is supplied by the user. Each "database tuple" that is processed by MCDB is actually an array or "bundle" of tuples, where t[i] for tuple bundle t denotes the value of t in the ith Monte Carlo database instance. That is, a query evaluation plan is executed exactly once, as in a traditional database management system, but over tuple bundles rather than tuples.

The potential performance benefit of the "tuple bundle" approach is that relational operations may efficiently operate in batch across all N Monte Carlo iterations that are encoded in a single tuple bundle. For example, if t[i].att equals some constant c for all i, then the relational selection operation $\sigma_{att=7}$ can be applied to t[i] for all possible values of i via a single comparison with the value c. Thus, bundling can yield an N-fold reduction in the number of tuples that must be moved through the system, and processed.

MCDB Delays Random Attribute Materialization as Long as Possible.

The obvious cost associated with storing all of the N generated values for an attribute in a tuple bundle is that the resulting bundle can be very large for large N. If N=1000 then storing all values for a single random character string can easily require 100 Kb per tuple bundle. MCDB alleviates this problem by materializing attribute values for a tuple as late as possible during query execution, typically right before random attributes are used by some relational operation.

In MCDB, Values for Random Attributes are Reproducible.

After an attribute value corresponding to a given Monte Carlo iteration has been materialized—as described above—and processed by a relational operator, MCDB permits this value to be discarded and then later re-materialized if it is needed by a subsequent operator. To ensure that the same value is generated each time, so that the query result is consistent, MCDB ensures that each tuple carries the pseudorandom number seeds that it supplies to the VG functions. Supplying the same seed to a given VG function at every invocation produces identical generated attribute values. One can view the seed value as being a highly compressed representation of the random attribute values in the tuple bundle.

6. Tuple Bundles in Detail

A tuple bundle t with schema S is, logically speaking, simply an array of N tuples—all having schema S—where N is the number of Monte Carlo iterations. Tuple bundles are manipulated using the new operators described in Section 7 and the modified versions of classical relational operators described in Section 8. In general, there are many possible ways in which the realized attribute values for a random table R can be bundled. The only requirement on a set of tuple bundles $t_1, t_2, \ldots t_k$ is that, for each i, the set $r_i = \cup_j t_j[i]$ corresponds precisely to the ith realization of R.

There are many possible ways to bundle individual tuples together across Monte Carlo database instances. For storage and processing efficiency, MCDB tries to bundle tuples so as to maximize the number of "constant" attributes. An attribute att is constant in a tuple bundle t if t[i].att=c for some fixed value c and i=1, 2, ..., N. Since constant attributes do not vary across Monte Carlo iterations, they can be stored in compressed form as a single value. In the blood pressure example discussed above, the natural approach is to have one tuple bundle for each patient, since then the patient ID is a constant attribute. Attributes that are supplied directly from deterministic relations are constant. MCDB also allows the implementor of a VG function to specify attributes as constant as a hint to the system. Then, when generating Monte Carlo replicates of a random table, MCDB creates one tuple bundle for every distinct combination of constant-attribute values encountered. MCDB often stores values for non-constant attributes in a highly compressed form by storing only the seed used to pseudorandomly generate the values, rather than an actual array of values.

A tuple bundle t in MCDB may have a special random attribute called the isPresent attribute. The value of this attribute for the ith iteration is denoted by t[i].isPres. The value of t[i]:isPres equals true if and only if the tuple bundle actually has a constituent tuple that appears in the ith Monte Carlo database instance. If the isPresent attribute is not explicitly represented in a particular tuple bundle, then t[i]:isPres is assumed to be true for all i, so that t appears in every database instance.

isPresent is not created via an invocation of a VG function. Rather, it may result from a standard relational operation that happens to reference an attribute created by a VG function. For example, consider a random attribute gender that takes the value male or female, and the relational selection operation $\sigma_B$ where B is the predicate "gender=female". If, in the ith database instance, t[i]:gender=male, then t[i]:isPres will necessarily be set to false after application of $\sigma_B$ to t because $\sigma_B$ removes t from that particular database instance. In MCDB the isPresent attribute is physically implemented as an array of N bits within the tuple bundle, where the ith bit corresponds to t[i]:isPres.

7. New Operations in MCDB

Under the hood, MCDB's query processing engine looks quite similar to a classical relational query processing engine. The primary differences are that (1) MCDB implements a few additional operations, and (2) the implementations of most of the classic relational operations must be modified slightly to handle the fact that tuple bundles, rather than tuples, flow through the system. We begin by describing in some detail the operations unique to MCDB.

The Seed Operator. For a given random table R and VG function V, the Seed operator appends to each tuple created by R's FOR EACH statement an integer unique to the (tuple, VG function) pair. This integer serves as the pseudorandom seed for V when expanding the tuple into an uncompressed tuple bundle.

The Instantiate Operator. The Instantiate operator is a unique and fundamental operator used by MCDB. For a given tuple bundle and uncertain attribute, this operator uses a VG function to generate a set of realized attribute values, one for each Monte Carlo replication. To understand the workings of Instantiate, it is useful to consider a slightly modified version of the example in Section 2 above, in which the mean and variance for the shifted blood pressure reading explicitly depend on a patient's gender, so that the table SPB_PARAM now has two rows and an additional GENDER attribute.

```
CREATE TABLE SBP DATA(PID, GENDER, SBP) AS
    OR EACH p in PATIENTS
        WITH SBP AS Normal (
            (SELECT s.MEAN, s.STD
            FROM SPB PARAM S
            WHERE s.GENDER = p.GENDER))
        SELECT p.PID, p.GENDER, b.VALUE
        FROM SBP b
```

The Instantiate operator accepts the following seven parameters, which are extracted from R's CREATE TABLE statement:

$Q_{out}$. This is the answer set for the "outer" query that is the source for the tuples in the FOR EACH clause. In our example, $Q_{out}$ is simply the result of a table scan over the relation PATIENTS. However, as in the discussion above, $Q_{out}$ may also be the result of a query. In general, a random relation R may be defined in terms of multiple VG functions, in which case R is constructed via a series of invocations of the Instantiate operation, one for each VG function.

VG. This is the variable generation function that will be used to generate attribute values.

VGAtts. This is the set of attributes whose values are produced by the VG function and are to be used to update the tuple bundles. In our example, V GAtts comprises the single attribute Normal.VALUE.

OutAtts. This is the set of attributes from $Q_{out}$ that should appear in the result of Instantiate. In our example, OutAtts comprises the attributes p.PID and p.GENDER.

$Q_{in,1}, Q_{in,2}, \ldots, Q_{in,r}$. These are the answer sets for the "inner" input queries used to supply parameters to V G. In our example, there is only one inner input query, and so Qin,1 is the result of SELECT s.MEAN, s.STD, GENDER FROM SBP_PARAM s. Note that the attribute s.GENDER is required because this attribute will be used to join $Q_{out}$ with $Q_{in,1}$.

InAtts$_1$, InAtts$_2$, ..., InAtts$_r$. Here InAtts$_i$ is the set of those attributes from the ith inner query that will be fed into VG. In our example, InAtts$_1$ consists of s.MEAN and s.STD.

$B_1, B_2, \ldots, B_r$. Here $B_i$ is the boolean join condition that links the ith inner query to the outer query. In our example, $B_i$ is the predicate "s.GENDER=p.GENDER".

We first assume (as in our example) that there is only one inner query, so that we have only $Q_{in}$, InAtts, and B in addition to $Q_{out}$, VGAtts, and OutAtts; extensions to multiple inner queries (and multiple VG functions) are given below. Given this set of arguments, an outline of the steps implemented by the Instantiate operator to add random attribute values to a stream of input tuples is as follows. The process is illustrated in FIG. 2, which shows a diagram of the Instantiate operation 10 for a single inner input query in accordance with one embodiment of the invention.

1. First, an input pipe 12 supplying tuples from $Q_{out}$ is forked, and copies of the tuples from $Q_{out}$ are sent in two "directions". One fork 14 bypasses the VG function 16 entirely, and is used only to supply values for the attributes specified in OutAtts. For this particular fork, all of the attributes present in $Q_{out}$ except for those in OutAtts ∪{seed} are projected away and then all of the result tuples are sorted based upon the value of the tuple's seed.

2. The second fork 18 is used to supply parameters to the VG function 16. $Q_{in}$ is supplied by the "inner" input pipe 20. Using this fork 18, the set $S = Q_{out} \bowtie Q_{in}$ is computed; all attributes except for the VG function seed and the attributes in InAtts are then projected away after the join.

3. Next, S is grouped (ordered) so that if two tuples $s_1, s_2$ in S were produced by the same t∈$Q_{out}$, then $s_1$ and $s_2$ are always found in the same group. This is easily accomplished by sorting S on the seed value contained in each tuple using the Sort$_{seed}$ function 22. Note that tuples in the same group have the same seed value.

4. Then, for each group $S_i$ in S, the VG function 16 produces a result array OutputTuples using the pseudocode in FIG. 3. After the pseudocode is completed for a given $S_i$, the rows in OutputTuples are sent onwards, to update the tuple bundles. In FIG. 3, $t_i \epsilon Q_{out}$ is the outer tuple corresponding to $S_i$, $t_i$.seed is the common seed value, and • denotes tuple concatenation. This code first feeds each of the parameter values in the set $S_i$ into the function VG (line 3). The code then performs N Monte Carlo iterations (lines 5-9). The seed value $t_i$.seed that produced the set of tuple bundles is appended to the row, so that it is possible to identify which tuple from the outer input query was used to produce the row.

5. Finally, the results of steps 1 and 4 are merged (joined) using the merge function 24 based upon the seed values, so that the attributes supplied by $Q_{out}$ can be combined with the attributes produced by the VG function. During this merge step, the putative instantiated row of R that has just been created may be filtered out by applying the final WHERE predicate, if any, that appears after the final SELECT clause in the CREATE TABLE statement. The results are then is fed to the output pipe 26

Handling Multiple Inner Queries.

Figure 4:
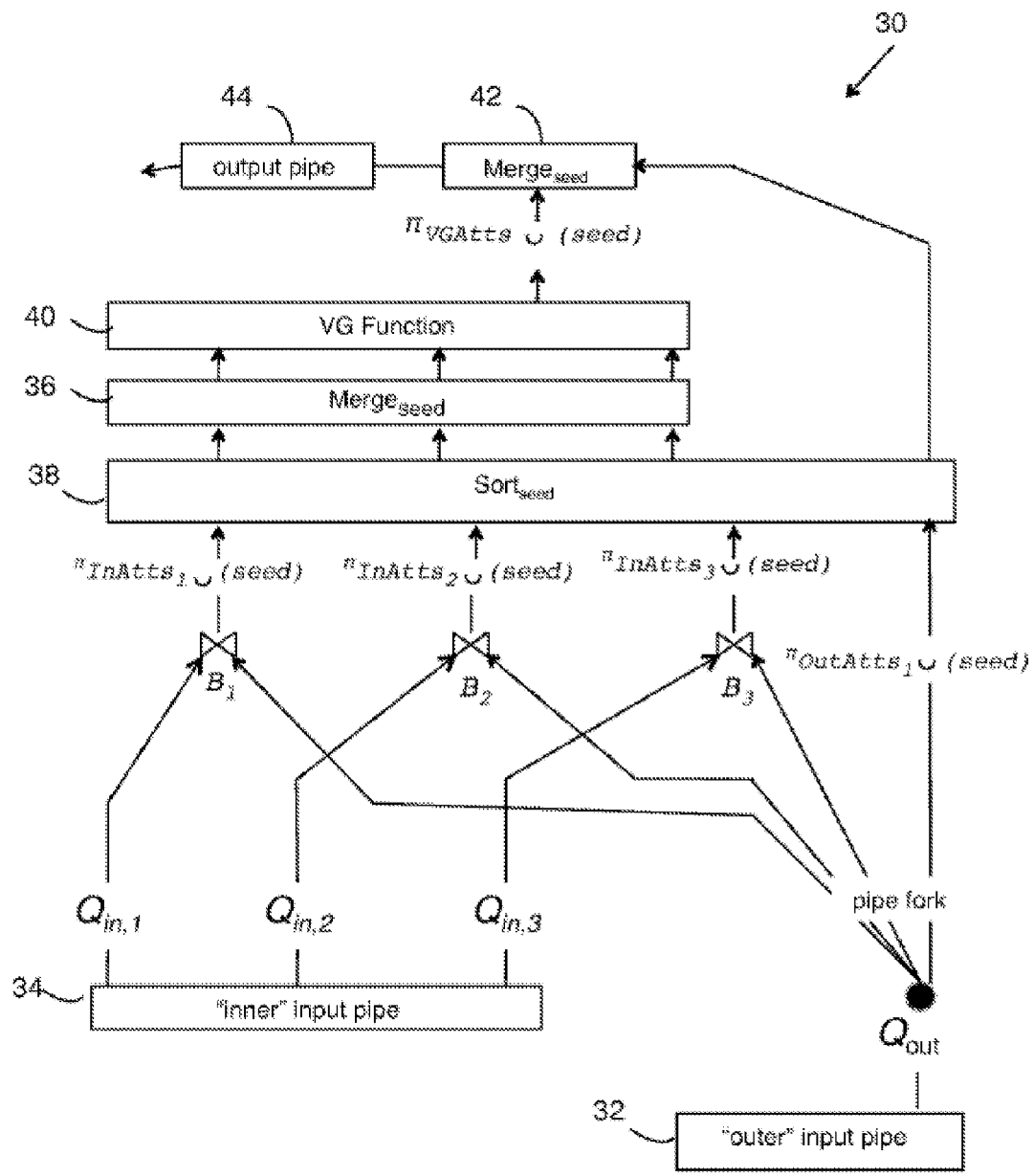
FIG. 4 shows a diagram of an Instantiate operation for multiple inner input queries in accordance with an embodiment of the invention.

When there are multiple inner queries that supply input parameters to the VG function, the foregoing process must be generalized slightly. The generalization is pictured in FIG. 4, which shows a diagram of an Instantiate operation 30 for multiple inner input queries in accordance with an embodiment of the invention. Rather than only forking the outer input pipe 32 that supplies tuples from $Q_{out}$ in two directions, one additional fork is required for each additional inner query in the "inner" input pipe 34. Each of the resulting parameter streams is merged, or grouped, in the merge function 36 after the sort function 38 so that each group contains only parameters with exactly the same seed value. Once this single set of parameters is obtained, it is sent to the VG function 40 via calls to TakeParams, and the rest of the Instantiate operation proceeds exactly as described above using the merge function 42 with the results being sent to the output pipe 44.

Handling Multiple VG Functions.

When k (>1) VG functions appear in the same CREATE TABLE statement, Instantiate is not changed at all; instead, k Instantiate operations are executed, and then a final join is used to link them all together. In more detail, MCDB first seeds each outer tuple with k seeds, one for each VG function, and then appends a unique synthetic identifier to the tuple. The resulting stream of tuples is then forked k ways. The kth fork is sent into an Instantiate operation for the kth VG function, essentially implementing a modified CREATE TABLE statement in which all references to VG functions other than the kth have been removed and in which the synthetic identifier is added to the final SELECT list. MCDB executes a k-way join over the k result streams, using the synthetic identifiers as the join attributes (and appropriately projecting away redundant attributes).

The Split Operator.

One potential problem with the "tuple bundle" approach is that it can become impossible to order tuple bundles with respect to a nonconstant attribute. This is problematic when implementing an operation such as relational join, which typically requires ordering the input tuples by their join attributes via sorting or hashing.

In such a situation, it is necessary to apply the Split operator. The Split operator takes as input a tuple bundle, together with a set of attributes Atts. Split then splits the tuple bundle into multiple tuple bundles, such that, for each output bundle, each of the attributes in Atts is now a constant attribute. Moreover, the constituent tuples for each output bundle t are marked as nonexistent (that is, t[i].isPres=false) for those Monte Carlo iterations in which t's particular set of Atts values is not observed.

For example, consider a tuple bundle t with schema (fname, lname, age) where attributes fname=Jane and lname=Smith are constant, and attribute age is non-constant. Specifically, suppose that there are four Monte Carlo iterations and that t[i]:age=20 for i=1; 3 and t[i]:age=21 for i=2; 4. We can compactly represent this tuple bundle as t=(Jane, Smith, (20, 21, 20, 21), (T, T, T, T)), where the last nested vector contains the isPresent values, and indicates that Jane Smith appeared in all four Monte Carlo iterations (though with varying ages). An application of the Split operation to t with Atts={age} yields two tuple bundles $t_1$=(Jane, Smith, 20, (T, F, T, F)) and $t_2$=(Jane, Smith, 21, (F, T, F, T)) Thus, the nondeterminism in age has been transferred to the isPresent attribute.

The Inference Operator.

The final new operator in MCDB is the Inference operator. The output from this operator is a set of distinct, unbundled tuples, where unbundled tuple t' is annotated with a value f that denotes the fraction of the Monte Carlo iterations for which t' appears at least once in the query result. (Typically, one attribute of t' will be a primary key, so that t' will appear at most once per Monte Carlo iteration.) Note that f estimates p, the true probability that t' will appear in a realization of the query result.

MCDB implements Inference operator as follows. Assume that the input query returns a set of tuple bundles with exactly the set of attributes Atts (not counting the isPresent attribute). Then 1. MCDB runs the Split operation on each tuple bundle in Q using Atts as the attribute-set argument. This ensures that each resulting tuple bundle has all of its nondeterminism "moved" to the isPresent attribute.
2. Next, MCDB runs the duplicate removal operation (see the next section for a description).
3. Finally, for each resulting tuple bundle, Inference counts the number of values for which t[i].isPres=true. Let this value be n. The operator then outputs a tuple with attribute value t[•].att for each att E Atts, together with the relative frequency f=n/N.

8. Standard Relational OPS

In addition to the new operations described above, MCDB implements versions of the standard relational operators that are modified to handle tuple bundles.

Given a boolean relational selection predicate B and a tuple bundle t, for each i, t[i].isPres=B(t[i]) t[i].isPres. In the case where t.isPres has not been materialized and stored with t, then t[i].isPres is assumed to equal true for all i prior to the selection, and t[i].isPres is set to B(t[i]).

If, after application of B to t, t[i] isPres=false for all i, then t is rejected by the selection predicate and t is not output at all by $\sigma_B(t)$. If B refers only to constant attributes, then the Selection operation can be executed in O(1) time by simply accepting or rejecting the entire tuple bundle based on the unique value of each of these attributes.

Projection in MCDB is nearly identical to projection in a classical system, with a few additional considerations. If a non-constant attribute is projected away, the entire array of values for that attribute is removed. Also, so that an attribute generated by a VG function can be re-generated, projection of an attribute does not necessarily remove the seed for that attribute unless this is explicitly requested.

The Cartesian product operation (x) in MCDB is also similar to the classical relational case. Assume we are given two sets of tuple bundles R and S. For r∈R and s∈S, define t=r⊕S to be the unique tuple bundle such that 1. t[i]=r[i]●s[i] for all i, where ● denotes tuple concatenation as before, but excluding the elements r[i].isPres and s[i].isPres.
2. t[i].isPres=r[i].isPres[i].isPres.

Then the output of the x operation comprises all such t.

The join operation (▷◁) with an arbitrary boolean join predicate B is logically equivalent to a x operation as above, followed by an application of the (modified) relational selection operation $\sigma_B$. In practice, B most often contains an equality check across the two input relations (i.e., an equijoin). An equijoin over constant attributes is implemented in MCDB using a sort-merge algorithm. An equijoin over non-constant attributes is implemented by first applying the Split operation to force all of the join attributes to be constant, and then using a sort-merge algorithm.

To execute the duplicate-removal operation, MCDB first executes the Split operation, if necessary, to ensure that isPresent is the only non-constant attribute in the input tuple bundles. The bundles are then lexicographically sorted according to their attribute values (excluding isPresent). This sort operation effectively partitions the bundles into groups such that any two bundles in the same group have the identical attribute values. For each such group T, exactly one result tuple t is output. The attribute values of t are the common ones for the group, and t[i].isPres=$\vee_{t' \in T}$t'[i].isPres for each i.

To sum a set of tuple bundles T over an attribute att, MCDB creates a result tuple bundle t with a single attribute called agg and sets t[i]agg=$\Sigma_{t' \in T}$I(t'.iPres)×t'[i].att. In this expression, I is the indicator function returning 1 if t'[i].isPres=true and 0 otherwise. Standard SQL semantics apply, so that if the foregoing sum is empty for some value of i, then t[i].agg=NULL. Other aggregation functions are implemented similarly.

Figure 5:
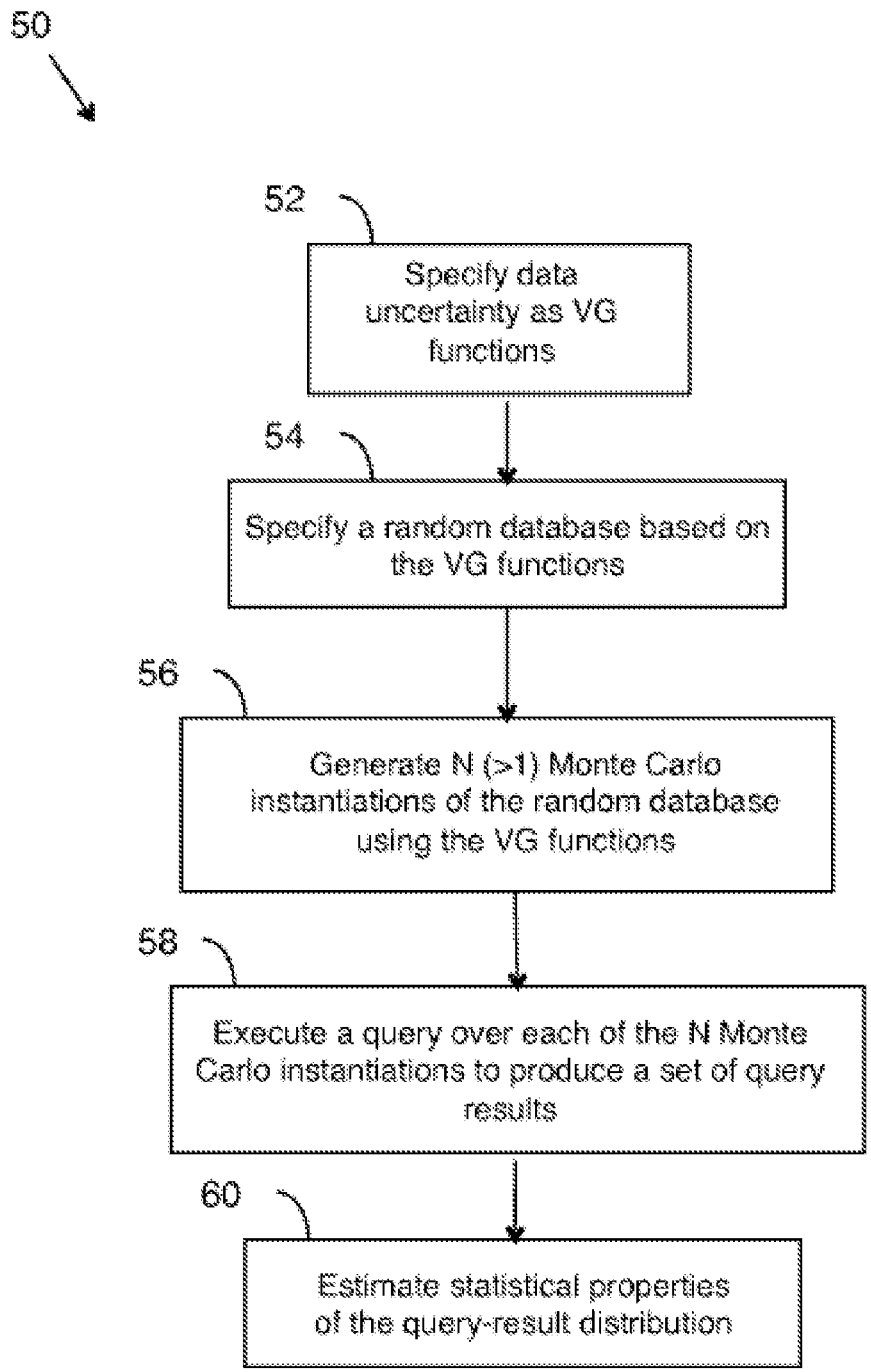
FIG. 5 shows a flowchart of a process for processing uncertain data in accordance with an embodiment of the invention.

FIG. 5 shows a flowchart of a process 50 for managing uncertain data in accordance with an embodiment of the invention. In block 52, the uncertainty in a set of data is specified as VG functions. In block 54, a random database based on the VG functions is specified. Next, N (>1) Monte Carlo instantiations of the random database are generated using the VG functions, in block 56. In block 58, a query is executed over each of the N Monte Carlo instantiations to produce a set of query results. Statistical properties of the query-result distribution are then estimated, in block 60.

As can be seen from the above disclosure, embodiments of the invention provide a Monte Carlo-based system for managing uncertain data. The MCDB approach—which uses the standard relational data model, VG functions, and parameter tables—provides a powerful and flexible framework for representing uncertainty. Experiments indicate that the MCDB techniques permit handling of uncertainty at acceptable overheads relative to traditional systems. Overall, the approach embodied in MCDB has the potential to facilitate real-world risk assessment and decision-making under data uncertainty, both key tasks in a modern enterprise.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present invention may take the form of a computer program product embodied in any tangible medium of expression having computer usable program code embodied in the medium. Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. Other examples of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, and/or RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 6:
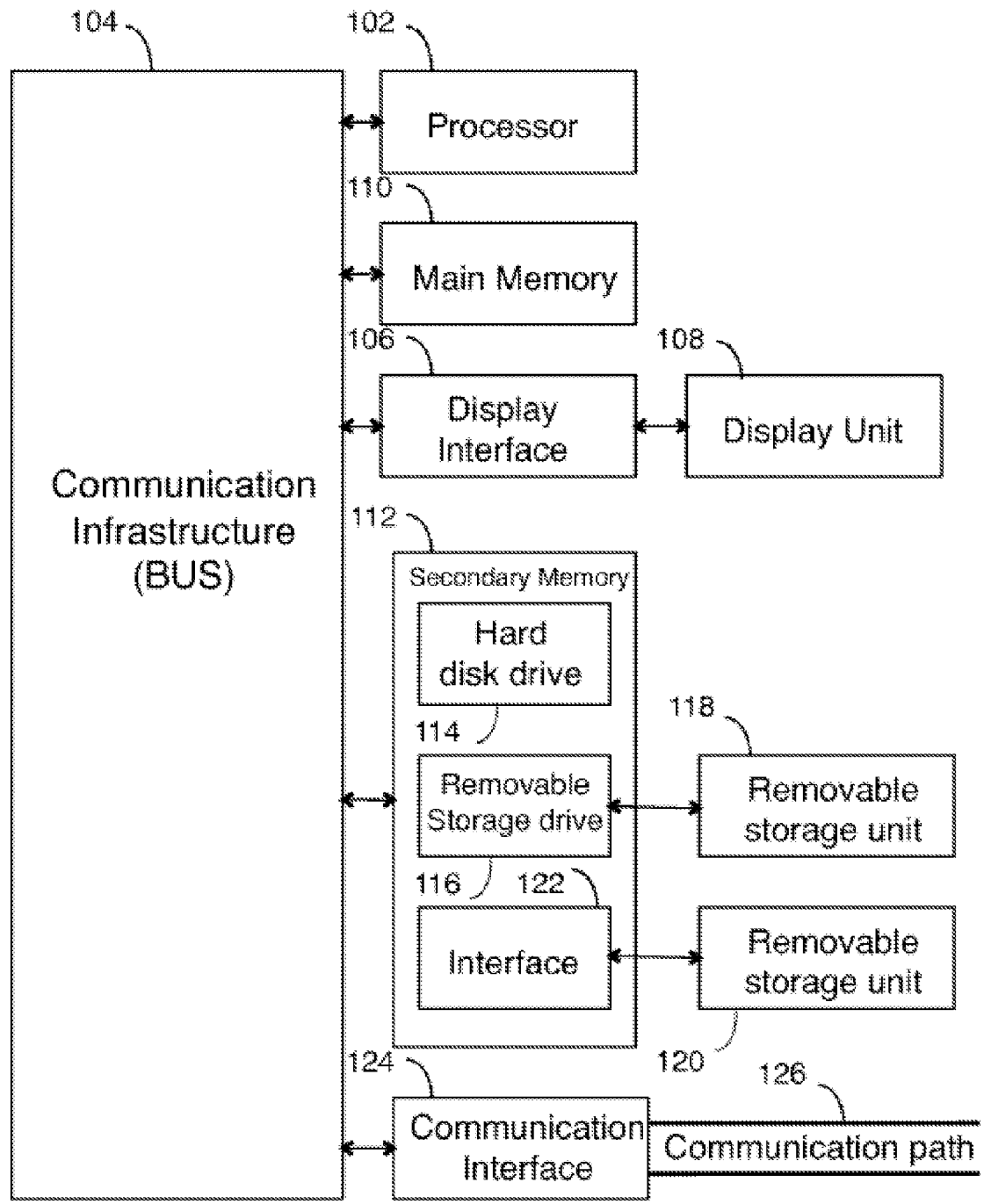
FIG. 6 shows a high level block diagram of an information processing system useful for implementing one embodiment of the present invention.

FIG. 6 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method comprising:
specifying data uncertainty using at least one variable generation (VG) function wherein said VG function generates pseudorandom samples of uncertain data values;
specifying a random database based on said VG function;
generating, by a processor coupled to memory, a number of N Monte Carlo instantiations of said random database, wherein N is a number greater than 1;
identifying a plurality of database tuple bundles t, wherein each of the plurality of database tuple bundles t is a data structure comprising a correlated tuple from each of the N Monte Carlo instantiations;
representing the plurality of database tuple bundles t in a compressed form in which only pseudorandom numbers used to generate the uncertain data values are represented;
expanding the plurality of database tuple bundles t represented in the compressed form to an expanded form, wherein the plurality of database tuple bundles t is represented in the expanded form when all instantiated attribute values are explicitly represented;
executing, by a processor coupled to memory, a query Q over the N Monte Carlo instantiations, wherein said executing comprises:
executing a query plan for the query Q once over each of the plurality of database tuple bundles; and
outputting query-results, where zero or more numerical values that are used to estimate statistical properties of the probability distribution of the result of the query Q;
maintaining a running statistical property of query-results as each query-result is determined, wherein each query-result corresponds to one or more of the N Monte Carlo instantiations; and
after N query-results are determined, outputting the final value of the running statistical property to be the estimated statistical property of the probability distribution of the result of the query Q.

2. The method according to claim 1, where executing the query plan further comprises filtering out tuples based on the compressed form of the plurality of database tuple bundles.

3. The method according to claim 1 wherein said outputting comprises outputting a set of pairs (v,f), where each v is a distinct tuple and f is the fraction of said Monte Carlo instantiations in which said tuple v appears at least once in a query result.

4. The method according to claim 1, wherein the second query computes an average of query-results in the table.

5. The method of claim 1, further comprising:
outputting N query-results, wherein each query-result corresponds to one of the N Monte Carlo instantiations; and
using the N query-results, computing an estimate of a statistical property of the probability distribution of the result of the query Q.

6. The method according to claim 1, wherein specifying said random database based on the VG function comprises specifying random tables based on the VG function.

7. A computer-implemented method comprising:
specifying data uncertainty using at least one variable generation (VG) function, wherein said VG function generates pseudorandom samples of uncertain data values;
specifying a random database based on said VG function;
generating, by a processor coupled to memory, a number N Monte Carlo instantiations of said random database, wherein N is a number greater than 1;
representing the plurality of database tuple bundles t in a compressed form in which only pseudorandom numbers used to generate the uncertain data values are represented;
expanding the plurality of database tuple bundles t represented in the compressed form to an expanded form, wherein the plurality of database tuple bundles t is represented in the expanded form when all instantiated attribute values are explicitly represented;
repeatedly executing a query, by the processor coupled to memory, over said multiple Monte Carlo instantiations to output a Monte Carlo result and associated query-results by identifying a plurality of database tuple bundles comprising correlated tuples from each of the Monte Carlo instantiations and executing the query on each of the plurality of database tuple bundles; and
estimating statistical properties of the probability distribution of said query-result;
maintaining a running statistical property of query-results as each query-result is determined, wherein each query-result corresponds to one or more of the N Monte Carlo instantiations; and
after N query-results are determined, outputting the final value of the running statistical property to be the estimated statistical property of the probability distribution of the result of the query Q.

8. The method according to claim 7, wherein specifying said random database based on said VG function comprises specifying random tables based on said VG function.

9. The method according to claim 8, wherein specifying random tables based on said VG function comprises specifying random tables of a relational database based on said VG function.

10. The method according to claim 7, wherein said VG function is user-defined.

11. The method according to claim 10, wherein the VG function is parameterized and is based on results of SQL queries executed over parameter tables stored in a relational database.

12. A system comprising:
a database containing data values and zero or more parameters tables;
a variable generation (VG) function component that receives the results of SQL queries over said parameters as input and that output pseudorandom samples of said uncertain data values;
a random database comprising said pseudorandom samples;
specifying a random database based on said VG function;
a processor generating multiple Monte Carlo instantiations of said random database;
a query execution component receiving a query and executing a query over said multiple Monte Carlo instantiations to output a Monte Carlo result and associated query-results by identifying a plurality of database tuple bundles comprising correlated tuples from each of the Monte Carlo instantiations and executing the query on each of the plurality of database tuple bundles, wherein the plurality of database tuple bundles are in a compressed form in which only pseudorandom numbers used to generate the uncertain data values are represented and expand the plurality of database tuple bundles t represented in the compressed form to an expanded form, wherein the plurality of database tuple bundles t is represented in the expanded form when all instantiated attribute values are explicitly represented; and a statistical property estimator receiving said Monte Carlo result, estimating statistical properties of the probability distribution of said query result, maintaining a running statistical property of query results as each query result is determined, wherein each query result corresponds to one or more of the N Monte Carlo instantiations; and outputting the final value of the running statistical property, after N query results are determined, wherein the running statistical property to be the estimated statistical property of the probability distribution of the result of the query Q.

13. A computer program product for managing uncertain data, said computer program product comprising a non-transitory computer readable medium having computer usable program code embodied therewith, said computer usable program code configured to:

specify data uncertainty using at least one variable generation (VG) function, wherein said VG function generates pseudorandom samples of uncertain data values;

specify a random database based on said VG function;

generate a number N Monte Carlo instantiations of said random database, wherein N is a number greater than 1;

represent the plurality of database tuple bundles t in a compressed form in which only pseudorandom numbers used to generate the uncertain data values are represented;

expand the plurality of database tuple bundles t represented in the compressed form to an expanded form, wherein the plurality of database tuple bundles t is represented in the expanded form when all instantiated attribute values are explicitly represented;

repeatedly execute a query over said multiple Monte Carlo instantiations to output a Monte Carlo result and associated query-results by identifying a plurality of database tuple bundles comprising correlated tuples from each of the Monte Carlo instantiations and executing the query on each of the plurality of database tuple bundles; and estimate statistical properties of the probability distribution of said query-result;

maintain a running statistical property of query-results as each query-result is determined, wherein each query-result corresponds to one or more of the N Monte Carlo instantiations; and after N query-results are determined, output the final value of the running statistical property to be the estimated statistical property of the probability distribution of the result of the query Q.

* * * * *